United States Patent [19]

Jordan

[11] Patent Number: 5,007,155

[45] Date of Patent: Apr. 16, 1991

[54] LATCH PIN INSTALLATION APPARATUS AND METHOD

[75] Inventor: John J. Jordan, Freehold Township, Monmouth County, N.J.

[73] Assignee: The United States of America as represented by the Secretary of the Navy, Washington, D.C.

[21] Appl. No.: 516,575

[22] Filed: Apr. 30, 1990

[51] Int. Cl.[5] ............................................ B23P 11/00

[52] U.S. Cl. ....................................... 29/434; 29/525; 29/525.1

[58] Field of Search ..................... 29/434, 525, 525.1; 81/388, 389, 395, 397, 398

[56] References Cited

U.S. PATENT DOCUMENTS 2,398,209 4/1946 Clemens ............................ 81/389 X
4,554,848 11/1985 Galletto ............................ 81/395 X
4,868,986 9/1989 Olson et al. ....................... 81/395 X

*Primary Examiner*—Timothy V. Eley
*Assistant Examiner*—C. Richard Martin
*Attorney, Agent, or Firm*—William C. Townsend; Edward J. Connors, Jr.

[57] ABSTRACT

Shipping container latch pins are installed utilizing apparatus including two pivotally interconnected working members having opposite endportions. Motive means in the form of a bolt member are carried by one endportion of one working member and are operative to move the associated endportions of the working members away from each other, thereby moving the opposite endportions toward each other to press a pivot pin into a latch. The opposite endportions are biased away from each other by a spring, and include opposed pairs of open-ended slots for receiving the ends of the pivot pin.

2 Claims, 2 Drawing Sheets

Fig. 4
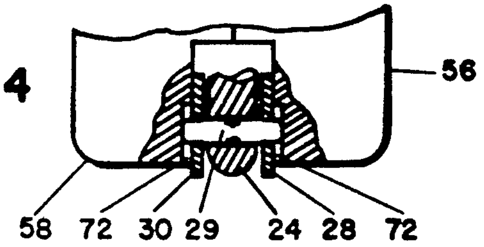
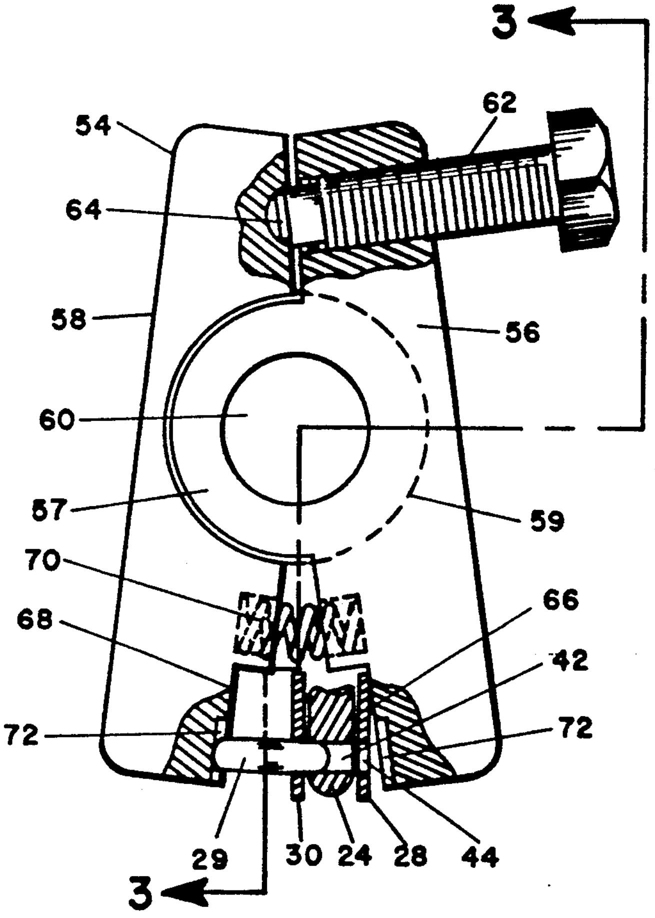
Fig. 2
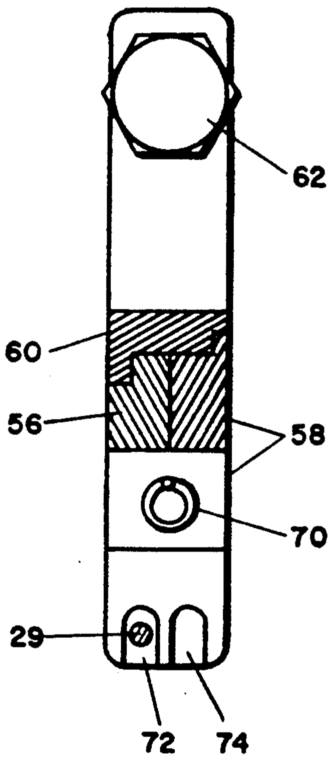
Fig. 3

LATCH PIN INSTALLATION APPARATUS AND METHOD

BACKGROUND OF THE INVENTION

This invention pertains to installing latch pins, and more particularly, to apparatus and method for installing pivot pins in latches of shipping containers.

Previously, a great deal of time and difficulty has been encountered in installing such pins. Additionally, costly damage to the containers has resulted from the hammers, punches and plier-type tools previously used to install the pins.

Accordingly, a main object of the invention is the provision of improved apparatus which reduces the time and difficulty of installing the pins, and which avoids damage to the containers.

Another object of the invention is to provide improved latch pin installation apparatus which is economical to manufacture and facile and precise in operation.

BRIEF DESCRIPTION OF THE DRAWINGS

In the drawings, where similar reference characters denote similar elements throughout the several views:

FIG. 2 is an elevational view, partly in section, of apparatus embodying the principles of the invention and showing the parts in position to install a pin in a latch.

FIG. 3 is a part-sectional view taken on line 3—3 of FIG. 2.

FIG. 4 is a detail view of the apparatus of FIG. 2, showing the parts as positioned after installation of the pin.

DETAILED DESCRIPTION OF THE PREFERRED EMBODIMENT

Figure 1:
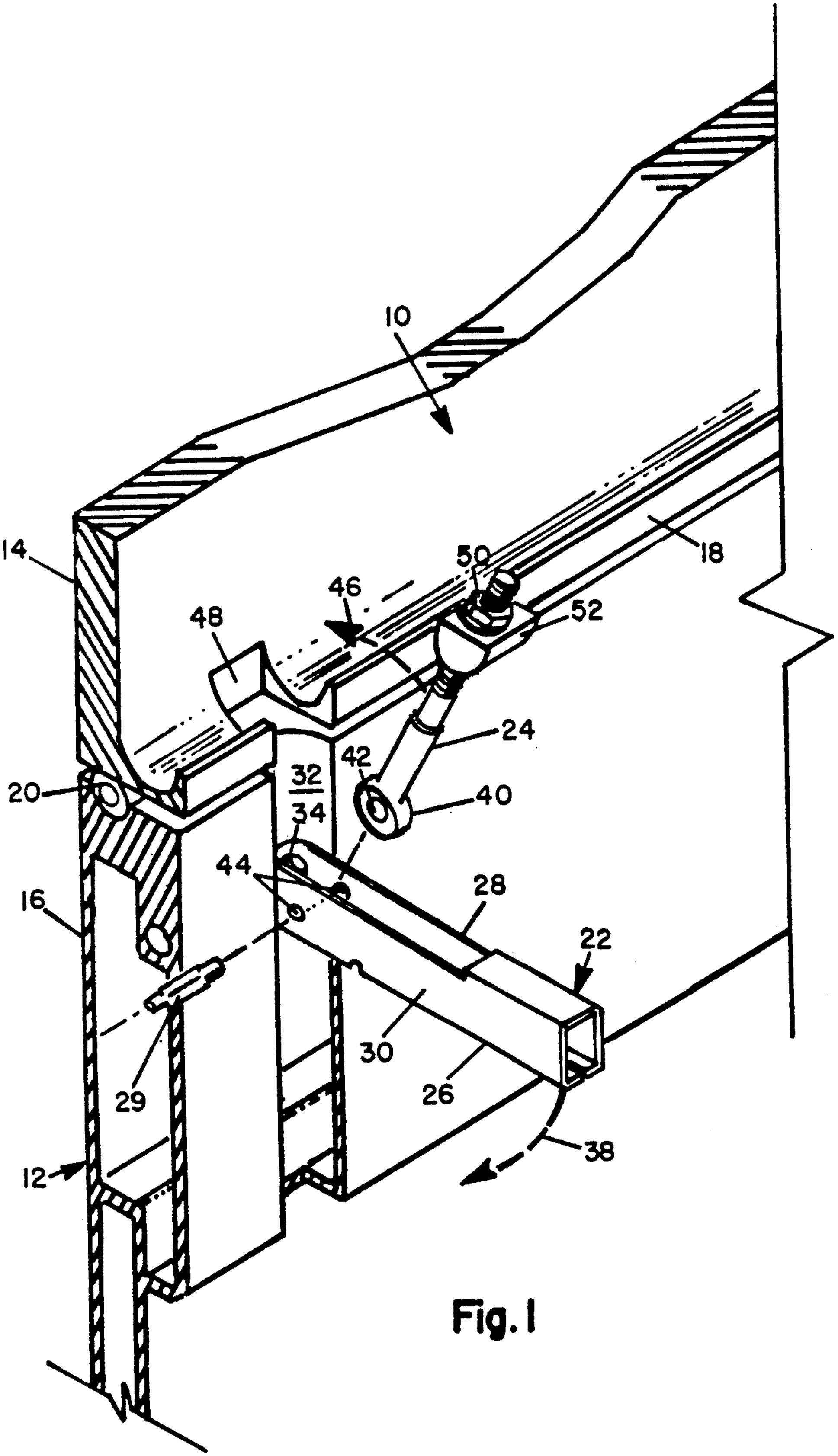
FIG. 1 shows, in perspective and partially exploded view, a latch of the type installed with aid of the apparatus of the present invention.

FIG. 1 depicts a portion of a shipping container having a boxlike cover portion 10 positioned on a boxlike base portion 12. It will be appreciated that cover 10 has closed top and side walls, one of the latter of which is indicated at 14, and an open bottom. Base 12 has closed bottom and side walls, one of which is shown at 16, and an open top. The bottom of cover 10 is coextensive with the top of base 12, so that placement of the cover on the base forms a closed, hollow container for shipping cargo. Cover 10 has, around the periphery of its bottom edge, an outwardly turned lip 18. Base 12 has, around the periphery of its upper edge, a resilient weatherstrip 20 which engages the lower edge of the cover to form a weathertight seal between the cover and base. The cover and base are preferably made of a light metal such as aluminum.

After assembly of the cover on the base, there is need for means to secure them together so that forces encountered in cargo handling and shipment do not cause separation of the cover from the base and thereby expose the contents of the container to weather and damage. For this purpose a plurality of latches are provided, spaced at intervals around the periphery of the container, and one of the latches is shown at 22 in partially assembled condition.

Latch 22 comprises a securing or tensioning bar portion 24, a lock or handle portion 26, and a pin 29 for pivotally interconnecting tensioner 24 and handle 26.

Latches are furnished in unassembled condition, separate from the container, and must be installed on the container. This is accomplished by first squeezing together parallel, planar ears 28, 30 on handle 26, and inserting the end of handle 26 into a recess or slot 32 formed in sidewall 16 of base 12. Outwardly projecting, opposing, frustoconical rims, as at 34, on ears 28, 30 snap into mating recesses in the walls of slot 32 upon release of the squeezing pressure on the ears. Handle 26 is then free to swing in a vertical plane, as indicated by arrow 38, about an axis defined by a line connecting the centers of rims 34.

The next step in the latch installation procedure is to insert the lower, bulbous end portion 40 of tensioner 24 between ears 28, 30 of handle 26, so that aperture 42 in tensioner 24 is aligned with opposing apertures 44 in ears 28, 30. Pivot pin 29 is then installed in aligned apertures 42, 44 in a manner to be described, whereupon tensioner 24 is free to swing about the axis of pin 29 in a vertical plane as shown by arrow 46, into a notch 48 in lip 18. Nut 50 on tensioner 24 can then be screwed down on the threaded upper end of tensioner 24, thereby moving bar member 52 downwardly into engagement with the portions of the lip that are beside notch 48 and are coextensive with the portions of bar 52 that overhang or extend beyond notch 48 in a direction along lip 18. Such portions of the lip thus act as a keeper for the latch. Handle 26 is then pivoted downwardly to be received in recess 32 in base 12, adding final tension to bar 24 and compressing weatherstrip 20 by cam action resulting from the positioning of pin 29 lower in recess 32 than the axis of rims 34, and holding cover 10 securely on base 12.

Pin 29 is a press fit in apertures 42, 44, and as previously indicated, its installation proved to be an arduous, time-consuming and therefore costly task that was multiplied by the number of latches on the container and often resulted in damage to the sidewalls of base 12. This problem is overcome by the present invention, of which a preferred embodiment will now be described.

With reference to FIG. 2, apparatus or tool 54 embodying the principles of the invention is shown as comprising a pair of working members 56, 58 which are pivotally interconnected at their midportions by a stub pin 60 (see also FIG. 3). Working members 56, 58 respectively have projecting ears 57, 59 which overlap one another and surround pin 60. The endportions of the working members on the upper side as viewed in FIG. 2 are in opposing relationship to one another, and the upper endportion of working member 56 carries motive means in the form of a hex-head bolt 62 which is threadedly received in working member 56, passes entirely through it, and spans the gap between the upper endportions to engage the upper endportion of working member 58. The latter preferably has a cavity 64 shaped to complement the end of the bolt and allow its free rotation. Rotation of the bolt in the receiving threads moves the bolt axially in working member 56, in a direction that is spaced from and normal to the axis of pivotal interconnection of the working members.

The lower endportions of working members 56, 58 are also in opposing relationship to one another, and have opposing faces 66, 68 respectively. A coil spring 70 has opposite ends respectively received in wells in the working members, and serves to bias the lower endportions of the working members in a direction away from one another. The opposing faces of the lower endportions each include a pair of cavities in the form of slots 72, 74 (see also FIG. 3) which are open-ended at the bottom of the tool, and the slots oppose one another for receiving the opposite ends of pin 29 as shown in FIG. 4.

In use, the tool operator unscrews bolt 62, and the biasing force of spring 70 moves the lower endportions of the working members away from one another, thereby moving the upper endportions of the working members toward each other as the withdrawal of the bolt from the gap between the upper endportions permits that gap to be narrowed. The tool operator then places the latch components in the positions shown in FIG. 1, and then inserts tensioner 24 between ears 28, 30 with apertures 42, 44 in alignment. The operator then inserts one end of pin 29, which has tapered end portions, into aperture 44 in ear 30 as far as the pin will go. The next step in the process is for the operator to dispose tool 54 over the latch components so as to receive the components in the manner shown in FIG. 2, with one end of pin 29 in slot 72 in working member 58. Bolt 62 is then rotated by the tool operator, preferably with aid of a ratchet-and-socket wrench, to screw the bolt into working member 56. This action forces the upper endportion of working member 58 away from the upper endportion of member 56, and thereby moves the lower endportions of the working members against the biasing force of spring 70 towards each other and presses pin 29 into the aligned apertures in ear 30, tensioner 24, and ear 28 to be received in the opposing slot in working member 56 as shown in FIG. 4. The operator then lifts the tool from the assembly, sliding the ends of the pin out through the open ends of slots 72, and the latch installation procedure then completed as described above in connection with FIG. 1. It may be desirable for the operator to unscrew bolt 62 a few turns to loosen tool 54 prior to removal from the latch.

Apparatus according to the invention is highly advantageous in markedly reducing the number of man-hours required to assemble the containers, and the amount of costly damage to the containers that was common with previously-used equipment. Moreover, the apparatus is advantageous in being amenable to either right-hand or left-hand operation. As viewed in FIG. 2, the apparatus is arranged for bolt 62 to be operated from the right side, i.e., for right-hand operation. However, by rotating the tool 180° about a vertical axis in the plane of the paper so that the bolt extends to the left, the tool is suitable for left-hand operation. It is for this reason that two pairs of slots 72, 74 are formed in the lower endportions of the working members, so that the pin can be received in opposing slots regardless of the hand mode of operation.

Although the invention has been described in connection with a preferred embodiment, modifications of that embodiment can be made without departing from the spirit of the invention. Such modifications are within the scope of the invention as defined by the appended claims.

I claim:

1. In apparatus for installing a pivot pin member in a latch in a shipping container having a cover portion and a base portion and a keeper member on one of the cover and base portions, the latch having securing means for engaging the keeper member to hold the cover and base portions together, lock means for tightening the securing means, and aperture means in the securing means and the lock means for receiving the pivot pin member, the improvement comprising first and second working members, each having opposite first and second endportions, the first endportions opposing one another and the second endportions opposing one another, means pivotally interconnecting the working members at their midportions, motive means carried by one of the working members for moving the first endportions in a direction away from one another and thereby moving the second endportions in a direction toward one another, whereby the second endportions are operative to press the pivot pin member into the aperture means in the latch members, the motive means including a bolt member threadedly received in the first endportion of the first working member and mounted for axial movement in a direction spaced from and normal to the axis of pivotal interconnection of the working members, the bolt member operatively engaging the first endportion of the second working member to move the first endportions in a direction away from one another upon rotation of the bolt member, and means biasing the second endportions in a direction away from one another, the second endportions including opposing faces and means defining opposing cavities in the opposing faces for receiving opposite ends of the pivot pin member, the cavities having open end portions transverse to the opposing faces and being arranged in opposing pairs in the opposing faces.

2. Method of installing a pivot pin member in a latch in a shipping container utilizing apparatus including first and second working members, each having opposite first and second endportions and a midportion, the first endportions opposing one another and the second endportions opposing one another, the second endportions including opposing faces and means defining opposing cavities in the opposing faces for receiving opposite ends of the pivot pin member, the cavities having open end portions transverse to the opposing faces, means pivotally interconnecting the working members at their midportions, and motive means carried by one of the working members for moving the first endportions in a direction away from one another and thereby moving the second endportions in a direction toward one another, comprising the steps of disposing the apparatus over partially assembled shipping container latch components including a first portion, a second portion, a pivot pin member, and means defining aligned apertures in the first and second portions for receiving the pivot pin member, the pivot pin member having an end portion inserted into the aperture in the first portion of the latch and an opposite end portion inserted into one of the opposing cavities, and operating the motive to move the second endportions of the working members toward each other and press the pivot pin member into the aligned apertures.

* * * * *